(12) United States Patent
Schuler (10) Patent No.: US 11,822,502 B2
(45) Date of Patent: Nov. 21, 2023

(54) BUS-CAPABLE DEVICE ARRANGEMENT HAVING A SWITCHABLE TERMINATING RESISTOR

(71) Applicant: Liebherr-Components Biberach GmbH, Biberach an der Riss (DE)

(72) Inventor: Michael Schuler, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 216 days.

(21) Appl. No.: 17/305,996

(22) Filed: Jul. 19, 2021

(65) Prior Publication Data

US 2021/0382843 A1 Dec. 9, 2021

Related U.S. Application Data

(63) Continuation of application No. PCT/EP2019/085707, filed on Dec. 17, 2019.

(30) Foreign Application Priority Data

Jan. 18, 2019 (DE) ...................... 10 2019 101 331.3

(51) Int. Cl.
*G06F 13/40* (2006.01)
*G06F 13/42* (2006.01)
(Continued)

(52) U.S. Cl.
CPC .......... *G06F 13/4086* (2013.01); *G06F 1/266* (2013.01); *G06F 13/4282* (2013.01);
(Continued)

(58) Field of Classification Search
CPC .. G06F 13/4086; G06F 1/266; G06F 13/4282; H04L 12/10; H04L 12/40078; H04L 2012/40215
See application file for complete search history.

(56) References Cited

U.S. PATENT DOCUMENTS 7,855,573 B1 12/2010 Yost
10,361,996 B2 * 7/2019 Schmitz ............ H04L 12/40045
(Continued)

FOREIGN PATENT DOCUMENTS

DE 10261386 7/2004
DE 102009045126 4/2011
(Continued)

*Primary Examiner* — Henry Tsai
*Assistant Examiner* — Harry Z Wang
(74) *Attorney, Agent, or Firm* — Levine Bagade Han LLP (57) ABSTRACT

The invention relates to a bus-capable device having an input interface and an output interface for connecting to a serial bus, particularly a CAN bus, wherein the input interface and the output interface each have at least one signal line connection, and further having a terminating resistor for terminating the bus and a switch apparatus for switching the terminating resistor active as a function of the connection status of the input and output interfaces, wherein the input interface and the output interface each having a supply voltage connection for providing a supply voltage to the output and/or input interfaces of a respective next bus-capable device and a feedback connection for receiving the supply voltage from an output and/or input interface of a respective next bus-capable device, wherein the switch apparatus has an evaluation circuit for determining the presence of the supply voltage at the feedback connections of the input and output interfaces and an activation circuit for switching the terminating resistor active when the supply voltage is found by the evaluation circuit to be absent from the feedback connection of the input interface and/or from the feedback connection of the output interface.

18 Claims, 4 Drawing Sheets

(51) Int. Cl.
*H04L 12/10* (2006.01)
*G06F 1/26* (2006.01)
*H04L 12/40* (2006.01)

(52) U.S. Cl.
CPC ........ *H04L 12/10* (2013.01); *H04L 12/40078* (2013.01); *H04L 2012/40215* (2013.01)

(56) References Cited

U.S. PATENT DOCUMENTS

| | | | |
|---|---|---|---|
| 10,363,890 B2* | 7/2019 | Nakagawa | G06F 13/4086 |
| 2007/0120574 A1 | 5/2007 | Houston et al. | |
| 2007/0198100 A1* | 8/2007 | Butters | G05B 19/4185 |
| | | | 700/19 |
| 2011/0074214 A1* | 3/2011 | Takao | B60L 15/20 |
| | | | 307/38 |
| 2016/0254925 A1* | 9/2016 | Riedel | G06F 13/4068 |
| | | | 710/110 |
| 2017/0098904 A1* | 4/2017 | Kim | H01R 31/08 |
| 2017/0257140 A1* | 9/2017 | De Haas | H04L 25/0298 |

FOREIGN PATENT DOCUMENTS

| | | |
|---|---|---|
| DE | 102009056563 | 6/2011 |
| DE | 102010061188 | 1/2012 |
| DE | 102012223530 | 4/2014 |
| DE | 202013100624 | 6/2014 |
| DE | 102013201106 | 7/2014 |
| DE | 102014207389 | 10/2015 |
| WO | WO 2017/102479 | 6/2017 |
| WO | WO 2018/148683 | 8/2018 |
| WO | WO 2020/148059 | 7/2020 |

* cited by examiner

BUS-CAPABLE DEVICE ARRANGEMENT HAVING A SWITCHABLE TERMINATING RESISTOR

CROSS-REFERENCE TO RELATED APPLICATIONS

This application is a continuation of International Patent Application Number PCT/EP2019/085707 filed Dec. 17, 2019, which claims priority to German Patent Application Number DE 10 2019 101 331.3 filed Jan. 18, 2019, both of which are incorporated herein by reference in their entireties.

BACKGROUND

The present invention generally relates to the terminating of a bus system by a switchable terminating resistor. On the one hand, in this context, the invention relates to a bus-capable device having an input interface and an output interface for connection to a serial bus system, in particular to a CAN bus, having a five pole M12 plug connector, wherein the input and output interfaces each have at least one signal line connection, and further having a terminating resistor for terminating the bus system and having a switching device for switching the terminating resistor active in dependence on the connection state of the input and output interfaces. In this context, the invention also relates to a device arrangement having a plurality of such bus-capable devices whose input and output interfaces are connected to a serial bus. On the other hand, the invention also relates to an energy store in which a plurality of the aforesaid bus-capable devices are connected to one another by a serial bus.

High performance storage blocks have been used in recent times in energy storage technology with which control devices are associated to control the fast storage and withdrawal of large amounts of energy. If a plurality of such high performance stores are connected in parallel or are connected together to operate a larger, energy intensive working device such as a construction machine or a lifting apparatus such as an elevator in an electrified manner, the control devices of the individual energy stores are typically connected to one another by a bus system so that the control devices can communicate with one another and can optionally be controlled by a higher ranking system control to achieve a homogenization of the charge state and/or of the discharging/charging of the individual energy stores, for example. The bus system here can in particular be a serial bus such as a CAN bus (controller area network bus) that is widespread for the networking of control devices, but with such CAN busses not only being used for the networking of the control units of an energy store, but also for other control units and applications.

Such a CAN bus or serial bus has to be terminated at by a terminating resistor at the first and last participants for a problem-free function; for example to achieve sufficient fault-free operation and to avoid reflections at higher frequency data transmission rates. In the case of a CAN bus that is a serially operating two-wire bus having an open architecture that primarily uses twisted cables having a rated impedance of 120 ohms as the transmission medium, a typical terminating resistance or a typical bus termination with a CAN bus amounts to approximately 120 ohms at the two respective ends of the bus.

Such a terminating resistor is typically manually attached on the assembly of the bus system. A technician can, for example, plug in a plug having such a terminating resistor into the output interface of the last participant that remains unconnected and into the likewise unconnected input interface of the first participant to terminate the ends of the serial bus. Depending on the installation environment and on the assembly site, such a manual attachment of a terminating resistor plug can, however, be complex and additionally bears the risk that the terminating is forgotten due to careless assembly of the termination. On the other hand, there is the problem that with energy stores, for example, the bus interfaces do not have a standard configuration for which there would be suitable termination plugs.

To avoid the manual attachment of terminating resistors, it has already been considered to provide switchable terminating resistors that can be switched in and out by a switching device depending on whether a termination is required or not. Document WO 2017/102 479 A1, for example, shows a circuit assembly for a switchable line termination of a CAN bus in a motor vehicle, wherein an electronic switching device having a microprocessor is there connected between the signal lines of the CAN bus and can connect a terminating resistor to the serial bus or can disconnect it therefrom. In this context, a medium bus voltage of the serial bus is decoupled at high ohms and is converted into a control voltage for the switching device, with the switching device using field effect transistors to switch the terminating resistors on or off. The switching on and off can be programmed using the microcontroller.

Document DE 20 2013 100 624 U1 further describes fieldbus-capable devices that each have a terminating resistor that can be connected and disconnected. The connecting or disconnecting should here take place by a control command that is transmitted from a higher ranging control device over the bus system itself and that is transferred to a respective participant, which requires, however, that the bus system already works so well that it can transmit said control command.

It is the object underlying the present invention to provide an improved bus-capable device, an improved arrangement of such bus-capable devices, and an improved energy storage device of the respective initially named kind that avoid the disadvantages of the prior art and further develop the latter in an advantageous manner. An automatic bus termination at the first and last participants of the bus system should in particular be achieved that makes a manual terminating, especially adapted termination plugs, and especially configured connections superfluous and equally reliably avoids any termination at interposed participants.

SUMMARY

In accordance with the invention, said object is achieved by a bus-capable in accordance with claim 1, by a device arrangement connected by a serial bus in accordance with claim 13, and by an energy storage device in accordance with claim 17. Preferred embodiments of the invention are the subject of the dependent claims.

It is therefore proposed to provide a self-recognition at the bus-capable devices that allows the respective device itself to recognize whether it is a first or last participant of the bus system or whether it is an interposed participant, and to activate a switchable terminating resistor in dependence on the self-determined participant position and otherwise to leave it deactivated. An external and the transmission of control commands over the possibly not yet functioning bus system can be dispenses with by such a self-recognition programming at the bus-capable devices, which makes the setting up of the bus system reliable and simple.

In accordance with the invention, it is proposed in accordance with a first aspect that the input and output interfaces of the bus-capable device each have a supply voltage connection separate from the signal line connection for the provision of a supply voltage to the input interface and/or output interface of a next bus-capable device to be connected via the bus system and a feedback connection for receiving the supply voltage from a next bus-capable device connected via the bus system, wherein the switching device for switching the terminating resistor active has an evaluation circuit for determining the application of the supply voltage to the feedback connection of the input interface and to the feedback connection of the output interface, and an activation circuit for switching the terminating resistor active when the application of the supply voltage to the feedback connection of the input interface and to the feedback connection of the output interface has respectively been detected by the evaluation circuit. The bus-capable device therefore has an input interface and an output interface that each have a separate supply voltage connection for providing the supply voltage to the respective next connected device and each have a feedback connection for receiving the supply voltage from the respective next connected device so that it can be determined by the application of the supply voltage to the feedback connection of the input interface and of the output interface whether the device in the serial bus is the first or last participant or is an interposed participant. If the supply voltage is present at both feedback connections, that is both at the input interface and at the output interface, further participants from which the supply voltage comes are connected to the bus at both sides of the device so that the terminating resistor is deactivated or can remain deactivated. If, however, the supply voltage is not applied at the feedback connection of the input interface and/or at the feedback connection of the output interface, a further adjacent participant is missing in at least one direction so that the respective device is the first or last participant in the serial bus and the activating circuit activates the terminating resistor.

Said input and output interfaces of the bus-capable device can be designed, for example, via different plugs by means of which the device can be connected to the bus at the input side and at the output side.

In this respect, the supply voltage connection and/or the feedback connection of the input interface and the supply voltage connection and/or the feedback connection of the output interface can each be configured as galvanically separate so that the provision or receiving of the supply voltage takes place separately from the control signal transmission. Said supply voltage connections and feedback connections can in particular be separate from the at least one signal line connection of the bus interfaces.

If the serial bus system is a CAN bus or another serially operating two-wire bus, the input interface and the output interface can comprise two signal line connections for transmitting a high signal and a low signal. Both the input interface and the output interface comprise the aforesaid supply connections and feedback connections, that are in particular galvanically separate, in addition to these CAN high and CAN low signal line connections.

The input interface and the output interface can advantageously also each comprise a ground connection that is advantageously likewise formed as galvanically separate.

The bus system can advantageously per se use standardized multipole plug connectors such as a five-pole plug connector that can be configured as a five-pole M12 plug connector, with standardized CAN bus lines also being able to be used, for example in the form of M12 CAN bus lines. Additional modifications at the plug connectors can be avoided.

The evaluation circuit by means of which the application of the supply voltage to the two feedback connections of the input and output interfaces is determined can generally be of different structures and can, for example, have a sensor system such as a current and/or voltage sensor for detecting the supply voltage at the feedback connection. In an advantageous further development of the invention, however, the evaluation circuit can have two switching elements and/or semiconductor components connected in series of which the one switching element receives the supply voltage at the feedback connection of the input interface and the other switching element receives the supply voltage at the feedback connection of the output interface as a control and/or switching signal, with the switching elements switching through or blocking a control signal depending on the application or non-application of the supply voltage. The control signal is only switched through by the serial circuit of the two switching elements when the supply voltage is applied to both feedback connections, that is a respective further bus-capable device is connected both to the input interface and to the output interface. Said control signal is then used to deactivate the terminating resistor.

The supply voltage applied to the feedback connections does not have to be directly provided to said switching elements as an input signal, but can optionally be processed or transformed beforehand, for example by the upstream connection of resistors.

The two switching elements connected in series can advantageously be field effect transistors or can comprise field effect transistors. MOSFETs can in particular be used as switching elements. Such a MOSFET (metal oxide semiconductor field effect transistor) belongs to the generally usable metal insulator semiconductor field effect transistor that are sometimes also called MISFETs. Even though doped polysilicon is today often used as a gate material, the name MOSFET is nevertheless maintained even though it is per se no longer correct due to the lack of a metallic gate material.

Such field effect transistors can largely be switchable without a loss of power and losslessly so that the terminating resistor can also be activated or deactivated with a small supply voltage that is transmitted from the supply connection of the one interface to the feedback connection of the other interface.

The field effect transistors connected in series can in particular switch a supply voltage through that is provided to the evaluation circuit or to the activation circuit of the switching device via a voltage supply connection as a control signal, by which control signal the activation circuit then deactivates or activates the activation circuit.

The supply voltage can in particular be supplied to the two field effect transistors connected in series from one side, while the other side of the two field effect transistors is connected to ground so that the supply voltage is drawn to the ground with semiconductor transistors switched through.

If one of the two field effect transistors is, however, not switched through because there is no supply voltage at one of the feedback connections of the input and output interfaces, the supply voltage of the switching device is not drawn to ground, but can rather be provided as a control signal to a switching relay that can then activate the terminating resistor.

Said switching relay for activating and deactivating the terminating resistor can be connected between the supply connection of the switching device, on the one hand, and the two field effect transistors connected in series, on the other hand, to be acted on or not acted on by the supply voltage in said manner in dependence on the switched state of the field effect transistors.

Said switching relay can here generally be of different configurations, with an optical switching relay being able to be used in accordance with an advantageous embodiment of the invention, in particular an optical relay having a low forward resistance.

An optical LED in the input of the relay can, for example, be supplied with current via a series resistor or via a plurality of series resistors, with the galvanically separate supply voltage of the switching device being able to serve as the supply voltage.

The two aforesaid field effect transistors, in particular MOSFETs, can be connected to the input of the relay in addition to the at least one series resistor.

At the output side, the terminating resistor 12 that is activated or deactivated in dependence on the switch position of the relay is connected to the optical relay. Said terminating resistor can terminate or not terminate the two signal lines of the serial bus system or the two signal lines of the input interface and/or the output interface, that is the CAN high and CAN low lines of the CAN bus system via the optical relay in dependence on its switched state.

A plurality of bus-capable devices of the described kind are connected to one another or are each connected to the bus line to set up the serial bus system, with the input interface of each device, on the one hand, and the output interface of each device, on the other hand, being connected so that the output interface of a first device is connected to the input interface of a second device, the output interface of which second device is in turn connected to the input interface of a third device. If three devices are integrated at the bus in said manner, the input interface at the first device remains unconnected and the output interface at the third device remains unconnected. The first device, its output interface there, provides the supply voltage to the feedback connection of the second device via the voltage supply connections. Conversely, the second device provides the supply voltage to the output interface of the first device through the supply voltage connection at its input interface.

In a similar manner, the output interface of the second device supplies the feedback connection of the third device with the supply voltage, with said third device providing the feedback connection of the output interface of the second device with the supply voltage via its input interface. The feedback connection at the output interface of the third device, however, remains without a supply voltage.

The first device accordingly lacks the supply voltage at the feedback connection of the input interface and the third device lacks the supply voltage at the feedback connection of the output interface. The second device, however, has the supply voltage applied at the feedback connections of the input interface and the output interface respectively.

The evaluation circuit of the second device accordingly recognizes that it is an interposed device whose connection resistor does not have to be activated. The two explained MOSFETs of the second device switch the supply voltage through to ground so that the switching relay does not activate the terminating resistor.

On the other hand, a respective one of the two field effect transistors in the first device and in the third device remains without any input signal being switched through so that the supply massage is not drawn to ground. This drives the respective switching relay into the activation position to activate the terminating resistor.

The self-recognition device can particularly advantageously be used at the modules of an energy storage device, with such an energy storage device being able to comprise a plurality of energy storage cells, in particular autonomous energy storage cells, that are coupled to one another over a serial bus. The respective energy storage cells can here comprise a control device, comprising a microprocessor and a program memory, for example, which control device of the energy storage cells are coupled to one another via the serial bus. A higher ranking system control can here optionally also be connected to the bus.

Said energy storage cells can advantageously comprise one or more storage blocks that can each comprise one or more storage capacitors, in particular in the form of double layer capacitors. Power controllers, in particular in the form of bidirectional DC-DC controllers by means of which the feeding of electrical energy into and out of the storage blocks can be controlled, are here associated with the storage blocks. The aforesaid control devices of the energy storage cells can in particular control said power controllers and can also be connected to the capacitor stores, for example to detect their charge state.

BRIEF DESCRIPTION OF THE DRAWINGS

The present invention will be explained in more detail in the following with reference to a preferred embodiment and to associated drawings. There are shown in the drawings.

DETAILED DESCRIPTION

Figure 1:
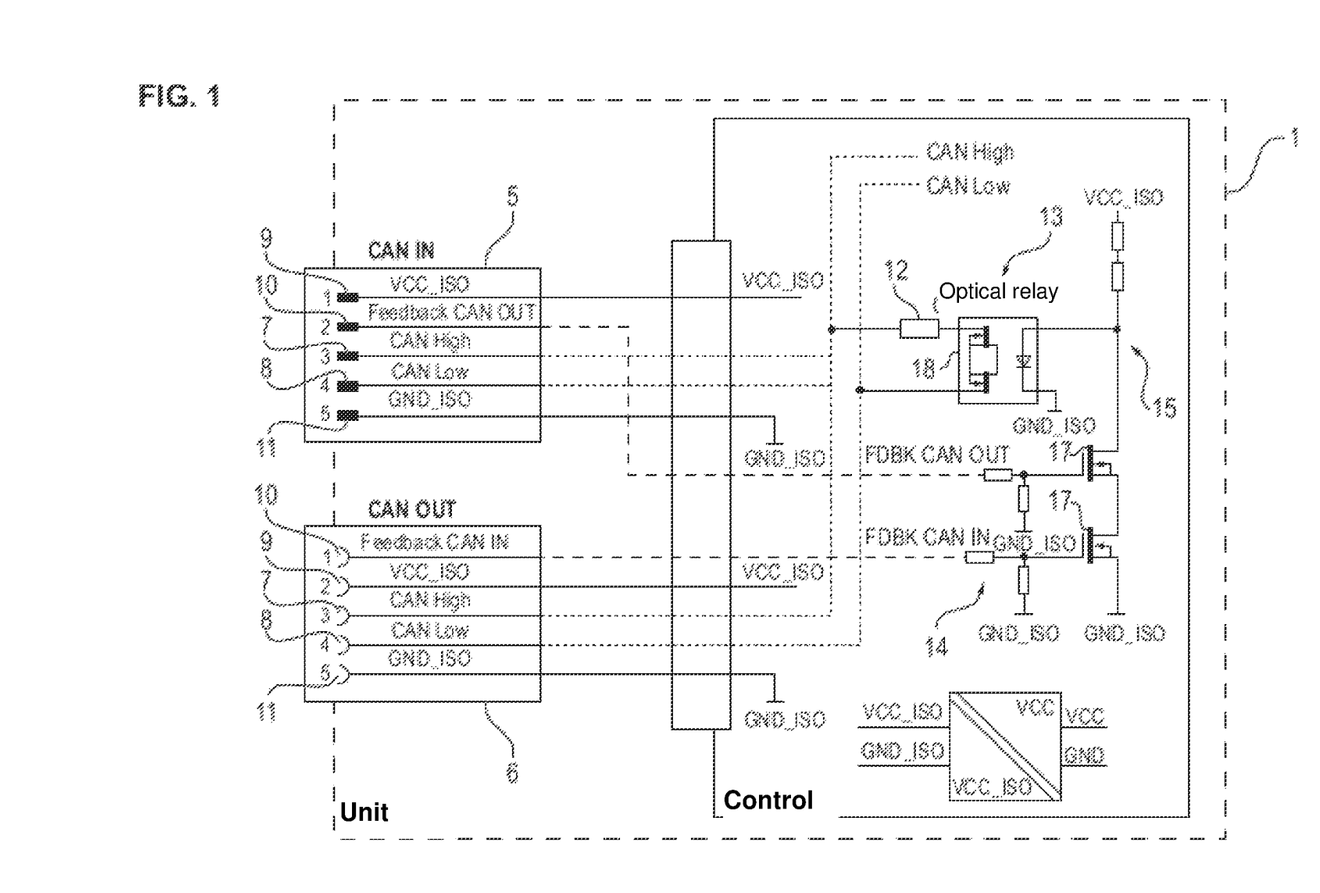
FIG. 1: a bus-capable device having a bus input interface and a bus output interface as well as a switching device for switching on and off a terminating resistor for terminating the bus connectable to the input and output interfaces.
Figure 2:
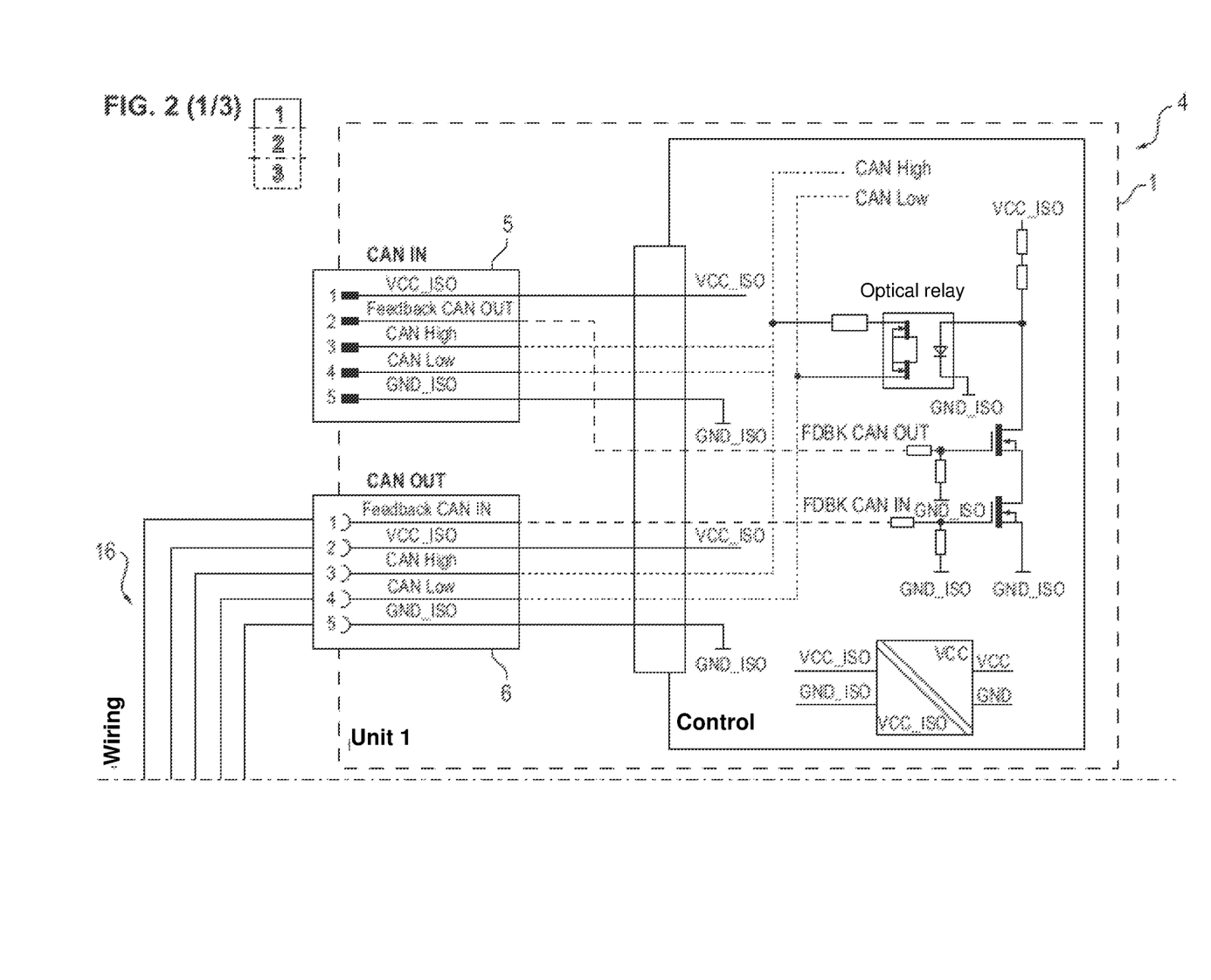
FIG. 2: the interconnection of a plurality of bus-capable devices that are each provided with a switching device for the automatic switching on and off of a terminating resistor.

As FIG. 1 shows, a bus-capable device—just like the further bus-capable devices 2 and 3 in FIG. 2—can have an input interface 5 and an output interface 6 respectively that can be formed, for example, in the form of plugs and that can be separately plugged into connected to a serial bus 16, in particular to a CAN bus.

Each of the input and output interfaces 5 and 6 here comprises two respective signal line connections 7 and 8 to be connected to the two signal lines of a serial bus 16, in particular in the form of a CAN bus, at its CAN high and CAN low lines.

In addition to the two signal line connections 7 and 8, each of the input and output interfaces 5 and 6 further comprise a supply voltage connection 9 to provide a supply voltage to the interface of the respective next device and comprise a feedback connection 10 with whose aid the supply voltage provided by a next device can be tapped or received. Said supply and feedback connections 9 and 10 are here advantageously each galvanically separate and/or electrically insulated from the signal line connections 7 and 8.

In addition to said supply and feedback connections 9 and 10, each of the input and output interfaces 5 and 6 advantageously further comprise a ground connection 22 that is likewise advantageously galvanically separate or is electrically insulated from the other connections.

As FIGS. 1 and 2 show, the supply connections 9 and feedback connections 10 are arranged complementary to one another at the input interface 5 and at the output interface 6 such that the supply voltage connection 9 of the input interface 5 is connected to the feedback connection 10 of an output interface 6 of the next device while the feedback connection 10 of the input interface 5 is connected to the supply connection 9 of the output interface of the next connected device. In other words, the arrangement of the supply and feedback connections 9 and 10 is made such that the feedback connection of the input interface receives the supply voltage from the output interface of a next device and the feedback connection of the output interface obtains the supply voltage from the input interface of a next device, cf. FIG. 2.

The signal line connections 7 and 8 and the ground connection 11 are, however, arranged in the same manner so that every interface is equally connected to the ground and the CAN high connection is connected to the CAN high line and the CAN low connection to the CAN low line.

As FIG. 1 and also FIG. 2 illustrate, the signals received at the feedback connections 10 of the input interface 5 and of the output interface 6 in the form of the possibly received supply voltage are provided to an evaluation circuit 14 that comprises two switching elements 17, preferably in the form of field effect transistors, that are connected in series. Said switching elements 17 can in particular be so-called MOSFETs.

As FIG. 1 shows, the supply voltages received at the feedback connections 10 can be provided to said MOSFETs 17 over a series resistor as an input signal or as a switching signal, with the one switching element 17 being connected to the feedback connection 10 of the input interface 5, while the other switching element 17 of the two elements connected in series is connected to the feedback connection 10 of the output interface 6.

The field effect transistor stage comprising the two MOSFETs 17 is connected to ground, cf. the ground connection 11-17, on the one hand, while the other end of the switching elements 17 connected in series is connected to the supply voltage.

If the two field effect transistors 17 are switched through, which is the case on application of the supply voltage to both feedback connections 10 of the two input and output interfaces 5 and 6, the supply voltage is drawn to ground. If, however, one of the two switching elements 17 or if both switching elements remains/remain blocked, the supply voltage is not drawn to ground and accordingly drives a switching relay 18 into a different switched position.

Said relay 18 is part of an activation circuit 15 by means of which a terminating resistor 12 provided at the device can be activated and deactivated. Said relay 18 can here in particular be an optical relay and can have a series resistor or a plurality of series resistors at the input side, cf. FIG. 1.

Depending on whether the supply voltage is drawn to ground via the switching elements 17 or is not drawn to ground, said relay 18 switches the terminating resistor 12 connected at the output side to the two signal line connections 7 and 8.

At the input side, the relay 18 is connected to the connection path between the supply voltage and ground, and indeed advantageously between the supply voltage connection and the two switching elements 17 connected in series, cf. FIG. 1.

As FIG. 2 shows, a plurality of such bus-capable devices 1, 2, and 3 can be serially connected to the bus 16, but with only the middle device 2 being connected to the bus 16 both at its input interface 5 and at its output interface 6. The input interface 5 at the first device 1 remains unconnected and only the output interface 6 is connected to the bus 16. The input interface 5 is connected at the last or third device 3, while the output interface 6 remains unconnected.

The input interface 5 of the first device 1 accordingly does not receive the supply voltage at its feedback connection 10—due to a lack of connection of a further device—so that the MOSFET 17 connected to the feedback connection 10 of the input interface 5 is not switched through and the supply voltage is accordingly not drawn to ground. The relay 18 is hereby switched into the active position in which the terminating resistor 12 is switched on.

In an analog manner, the output interface 6 of the third or last device 3 lacks a supply voltage incoming at the feedback connection 10 so that the MOSFET 17 connected to the output interface 6 or to its feedback connection 10 remains blocked and the supply voltage is likewise not drawn to ground. The supply voltage hereby also remains switched to the relay 18 at the third device 3, which relay 18 correspondingly activates the terminating resistor 12 of the third device 3.

In the second device 2, however, the supply voltage is applied both to the feedback connection 10 of the input interface 5 and to the feedback connection 10 of the output interface 6 so that both MOSFETs 17 switch through and draw the supply voltage to ground. The terminating resistor 12 accordingly remains deactivated.

The bus-capable devices 1, 2, and 3 shown in FIG. 2 can in particular be energy storage cells that each comprise a storage block, a capacitor store, in particular a double layer capacitor, and can comprise a bidirectional DC-DC controller. Such energy storage cells can furthermore each have a local or internal control device that controls the storage blocks and the DC-DC controllers and that is connected to the bus 16 via said input and output interfaces 5 and 6.

Provision can here advantageously be made that the switching device 13, including the evaluation circuit 14 and the activation circuit 15, and the terminating resistor 12 are integrated in the respective energy storage cell, that is in the respective device 1, 2, or 3, is in particular accommodated in the interior of the housing of the energy storage cell.

We claim:

1. A bus-capable device comprising:
   an input interface and an output interface for connection to a serial bus, wherein the serial bus comprises a CAN bus, and wherein the input interface and the output interface each have at least one signal line connection;
   a terminating resistor for terminating the serial bus;
   a switching device for switching the terminating resistor being active in dependence on the connection state of the input and output interfaces,
   wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface,
   wherein the supply and feedback connections are arranged at the input and output interfaces such that the supply connection of the input interface is connected to a feedback connection of the output interface of a next device to be connected to the serial bus, and wherein the feedback connection of the input interface is connected to a supply connection of the output interface of the next device to be connected to the serial bus, and wherein the supply connection of the output interface of the bus-capable device is connected to the feedback connection of the input interface of the next device to be connected to the serial bus, and wherein the feedback connection of the output interface of the bus-capable device is connected to the supply connection of an input interface of the next device to be connected to the serial bus.

2. The bus-capable device of claim 1, wherein the supply voltage connection and/or the feedback connection of the input interface and/or of the output interface is/are galvanically separate and/or is/are electrically insulated from the signal line connection.

3. The bus-capable device of claim 1, wherein the input interface and the output interface each comprise two signal line connections.

4. The bus-capable device of claim 1, wherein the input interface and the output interface each comprise a ground connection, and wherein the ground connections each comprise a galvanically separate ground.

5. The bus-capable device of claim 1, wherein the input interface and/or the output interface each has/have a five-pole plug connector, and wherein the five-pole plug connectors each are in the form of a five-pole M12 plug connector.

6. The bus-capable device of claim 1, wherein the evaluation circuit comprises two switching elements connected in series of which a first of the two switching elements is connected to the feedback connection of the input interface and a second of the two switching elements is connected to the feedback connection of the output interface.

7. The bus-capable device of claim 6, wherein the two switching elements are configured to draw a supply voltage connection of the activation circuit to ground when both switching elements are switched through or block from ground when at least one of the switching elements is not switched through.

8. A bus-capable device comprising:
an input interface and an output interface for connection to a serial bus, wherein the serial bus comprises a CAN bus, and wherein the input interface and the output interface each have at least one signal line connection;
a terminating resistor for terminating the serial bus;
a switching device for switching the terminating resistor being active in dependence on the connection state of the input and output interfaces,
wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface,
wherein the evaluation circuit comprises two switching elements each comprising a field effect transistor, wherein the field effect transistors are each in the form of a MOSFET, and wherein the field effect transistors are each configured to receive the supply voltage applied to the respective feedback connection or a voltage signal derived therefrom as an input signal.

9. The bus-capable device of claim 8, wherein the two switching elements are configured to draw a supply voltage connection of the activation circuit to ground when both switching elements are switched through or block from ground when at least one of the switching elements is not switched through.

10. The bus-capable device of claim 1, wherein the evaluation circuit comprises two switching elements, and wherein the activating circuit has a relay that is connected at the input side to the connection path between a supply voltage connection and the two switching elements connected in series.

11. A bus-capable device comprising:
an input interface and an output interface for connection to a serial bus, wherein the serial bus comprises a CAN bus, and wherein the input interface and the output interface each have at least one signal line connection;
a terminating resistor for terminating the serial bus;
a switching device for switching the terminating resistor being active in dependence on the connection state of the input and output interfaces,
wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface,
wherein the evaluation circuit comprises two switching elements, and wherein the relay is configured as an optical relay that has an input resistor that is connected to the connection path between the supply voltage connection and the two switching elements connected in series.

12. The bus-capable device of claim 1, wherein the activation circuit is connected at the output side to the terminating resistor that is connectable via the activation circuit to the two signal line connections of the input and output interfaces.

13. A device arrangement comprising bus-capable devices,
wherein each of the bus-capable devices comprises:
an input interface and an output interface for connection to a serial bus, wherein the serial bus comprises a CAN bus, and wherein the input interface and the output interface each have at least one signal line connection;
a terminating resistor for terminating the serial bus;
a switching device for switching the terminating resistor being active in dependence on the connection state of the input and output interfaces, wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface, wherein each of the bus-capable devices forms an energy storage cell and/or are integrated in an energy storage cell, wherein the energy storage cell has at least one storage block comprising a capacitor store, a power controller, and a control device that is connected to the storage block and/or to the power controller, and wherein the capacitor store comprises a double layer capacitor, and wherein the power controller comprises a bidirectional DC-DC controller, wherein the control device is connected to the serial bus via a respective input interface and output interface.

14. The device arrangement of claim 13, wherein a first one of the plurality of bus-capable devices is connected at its output interface to the input interface of a second bus-capable device whose output interface is in turn connected to the input interface of a third device, with the input and output interfaces being connected to one another.

15. An energy storage device comprising energy storage cells that respectively have at least one storage block comprising a capacitor store and a power control comprising a bipolar DC-DC power control, wherein each of the energy storage cells comprises a control device for controlling the storage block and/or the DC-DC power control, and wherein the control device of each of the energy storage cells comprises a respective input interface and an output interface for connection to a serial bus, wherein each of the energy storage cells is configured as a bus-capable device comprising:

an input interface and an output interface for connection to a serial bus, wherein the serial bus comprises a CAN bus, and wherein the input interface and the output interface each have at least one signal line connection;
a terminating resistor for terminating the serial bus;
a switching device for switching the terminating resistor being active in dependence on the connection state of the input and output interfaces,
wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface.

16. A bus-capable device comprising:
an input interface and an output interface for connection to a serial bus, wherein the serial bus comprises a CAN bus, and wherein the input interface and the output interface each have at least one signal line connection;
a terminating resistor for terminating the serial bus;
a switching device for switching the terminating resistor being active in dependence on the connection state of the input and output interfaces,
wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface,
wherein the evaluation circuit comprises two switching elements connected in series of which a first of the two switching elements is connected to the feedback connection of the input interface and a second of the two switching elements is connected to the feedback connection of the output interface.

17. The bus-capable device of claim 16, wherein the two switching elements are configured to draw a supply voltage connection of the activation circuit to ground when both switching elements are switched through or block from ground when at least one of the switching elements is not switched through.

18. A bus-capable device comprising:
an input interface and an output interface for connection to a serial bus, wherein the serial bus comprises a CAN bus, and wherein the input interface and the output interface each have at least one signal line connection;
a terminating resistor for terminating the serial bus;
a switching device for switching the terminating resistor being active in dependence on the connection state of the input and output interfaces,
wherein the input interface and the output interface each comprise a supply voltage connection for providing a supply voltage to the output and/or input interfaces of a respective next bus-capable device and comprise a feedback connection for receiving the supply voltage from an output and/or input interface of a respective next bus-capable device, and wherein the switching device comprises an evaluation circuit for determining the application of the supply voltage to the feedback connections of the input and output interfaces and an activation circuit for activating the terminating resistor when the lack of the supply voltage is determined by the evaluation circuit at the feedback connection of the input interface and/or at the feedback connection of the output interface,
wherein the evaluation circuit comprises two switching elements, and wherein the activating circuit has a relay that is connected at the input side to the connection path between a supply voltage connection and the two switching elements connected in series.

* * * * *